United States Patent

Matherne, Jr.

[11] Patent Number: 5,823,785
[45] Date of Patent: Oct. 20, 1998

[54] SIMULATOR FOR PIPE WELDING

[76] Inventor: Lee Matherne, Jr., 5300 Doliver, Houston, Tex. 77056

[21] Appl. No.: 958,507
[22] Filed: Oct. 27, 1997
[51] Int. Cl.$^6$ ............................. G09B 19/24; G09B 25/02
[52] U.S. Cl. .............................................................. 434/234
[58] Field of Search ............................................. 434/234

[56] References Cited

U.S. PATENT DOCUMENTS

| 4,041,615 | 8/1977 | Whitehill | 434/234 |
| 4,124,944 | 11/1978 | Blair | 434/234 |
| 4,132,014 | 1/1979 | Schow | 434/234 |
| 4,931,018 | 6/1990 | Herbst et al. | 434/234 |

FOREIGN PATENT DOCUMENTS 1297093  3/1987  U.S.S.R. ............................... 434/234

*Primary Examiner*—John A. Ricci
*Attorney, Agent, or Firm*—John D. Jeter

[57] ABSTRACT

A floor standing base supports a work holding manipulator table that is adapted to secure a vertical length of pipe for welding at a prepared juncture in the mounted pipe. The manipulator table is attached to the stand by a gimbal arrangement that allows it to tilt relative to a vertical axis a limited amount in all directions. Actuators also move the table a limited amount in all horizontal directions. The table movement actuators can be interlocked to produce a specific movement of the table and a table mounted workpiece. For certification work, requiring specific movement programs, recordings are provided to control the movement and movement relationships among the actuators. The recordings are, optionally, produced in the field by movement monitoring transducers attached to pipe being assembled in the actual representative environment. The record playback system controls all actuators and permits adjustment of the amplitude and rate of movement of the table for calibration and training purposes.

12 Claims, 2 Drawing Sheets

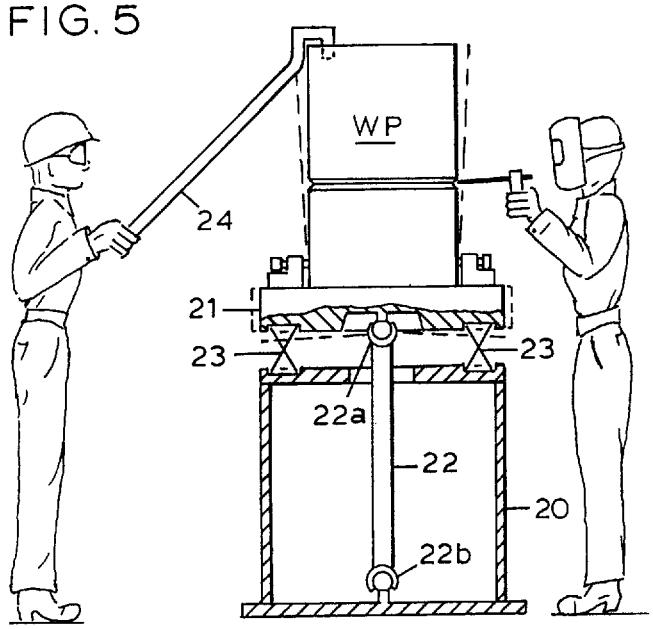

SIMULATOR FOR PIPE WELDING

This invention pertains to a simulator for the training of welders and for certification of welders for joining pipe lengths in vertical series. The pipe being welded is caused to move about relative to the welders platform in a manner reasonably duplicating the action experienced when welding on an offshore platform. This invention has a purpose of providing movement characteristics for certification procedures not yet defined by licensing authorities and to adapt to changes in those procedures when they are defined.

BACKGROUND OF THE INVENTION

In most offshore operations a platform is first provided, then vertical pipe strings are assembled from individual lengths by welding the ends together. Such pipe strings may include conductor pipes for offshore wells, and the like. Until the lower end of the pipe string reaches the sea bed the pipe is not fully stabilized laterally. The welder works to join the prepared and aligned ends of the last joint which extends overhead to the uppermost end of the top joint of the assembled pipe string. When the lower end of the pipe string begins to enter the seabed the pipe is more stabilized in that the bottom end stays in one place. The distance between platform and seabed may be in the nature of five hundred feet or more and the turbulence of the water body still influences the pipe because such lengths are somewhat flexible.

Welders have to be certified to work on oil field pipe strings. They weld up a sample which is tested for physical characteristics. The sample welded is normally stable and usually in a shop. When the certified welder encounters his first off shore installation, his certification comes into question because the instability of the situation may be new to him. A welder should be certified for performance proof in a situation that reasonably simulates the environment for which he is being prepared.

It is therefore an object of this invention to provide a simulator that moves the pipe about as it is being welded, in a manner reasonably representing the conditions under which a welder is expected to perform in the field.

It is another object of this invention to provide a movement simulator that can be manipulated for training of welders in accordance with the indicated demands, such as exaggerated movements, that varied circumstances may suggest.

SUMMARY OF THE INVENTION

A simulator has a ground resting base with a movable pipe mounting table generally centered on top. The table is arranged to support and secure a vertical length of pipe. The pipe has abutting ends prepared for welding when it is mounted on the table. The table is mounted on the base such that it can move a limited amount laterally in any direction. A limited amount of controlled tilt of the pipe is provided but little or no vertical movement is allowed. The table, and the mounted pipe, centerlines are vertically stabilized because the sides of the table must move vertically to permit the roll effect. In the simplest form the table is moved laterally by a central stabilizing bar which itself is moved by two actuators, each acting along one of the principal horizontal axes. The tilt of the table is controlled by a similar set of vertical actuators operating at some distance from the centerline of the table, peripherally spaced ninety degrees apart relative to the table vertical axis. If the tilt actuators are synchronized to do so only a nutating movement of the table takes place. Nutating movement moves the low point of the table peripherally around the base without rotating the table. If the lateral actuators are programmed to do so the table vertical centerline moves in a circle around the centerline of the base. Offshore pipe movement characteristics can be reasonably simulated by assuring nutating movement and the cited circular movement of the vertical axis of the table, provided that the two forms of movement are not synchronized. That prevents a practicing welder from anticipating a rhythmic repeatability of evolving movements. Until specifications for certification procedures are authoritatively defined, that practice is expected to dominate welder certification for offshore work, as specified by individual contractors.

To standardize the certification tests, all actuators can be mechanically or electrically interlocked to assure that all tests are alike.

The version of the simulator preferred for use with eventually refined certification processes will use recorded actuation programs, and that option is provided. Movement sensors, signal conditioners, and a recording system attached to a representative pipe column in the operating area, usually offshore, will provide an agreed upon standard. By practices now well established in the instrumentation art, the recording, replayed on instruments dedicated to the purpose, can direct the movement of controlled actuators, defined above for the table, to produce similar movements of the mounted pipe specimen on the simulator table. Standards for North Sea operations can be expected to differ, for instance, from those usable for certification for inland water bodies or the Gulf of Mexico.

BRIEF DESCRIPTION OF DRAWINGS

In the drawings wherein like features have similar captions.

FIG. 5 is a side view of a simplified version of the simulator useful for manual manipulation of the workpiece.

DETAILED DESCRIPTION OF DRAWINGS

Figure 1:
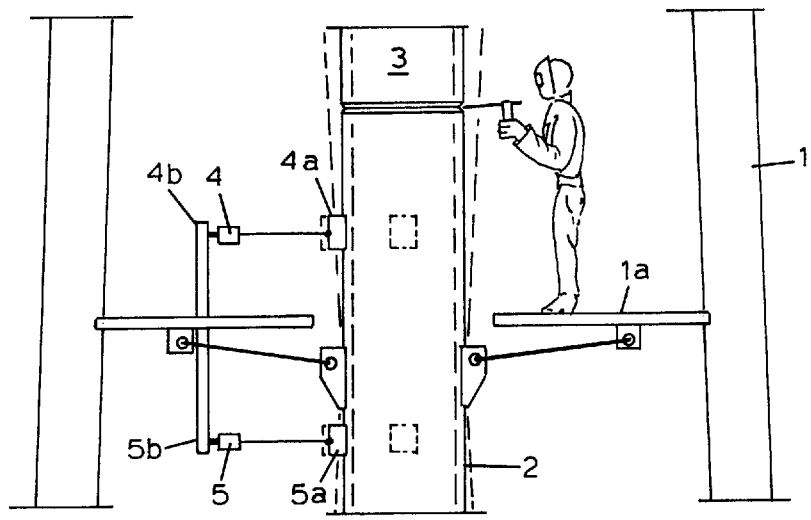
FIG. 1 is a side view, partly cut away of a portion of a symbolic offshore platform with a pipe column being assembled.

In the drawings certain features well established in the art and not bearing upon points of novelty are omitted in the interest of descriptive clarity. Such omitted features may include weld lines, some threaded fasteners, threaded joints, pins and the like.

In FIG. 1 a workstation portion of a representative offshore structure 1 has work deck 1a showing a welder at typical work on pipe column 2 in the process of welding pipe length 3 to the column. The pipe column is snubbed to the platform by symbolic lines secured to common pad eyes on the pipe and platform. Such securing means differs among different rigs. Standards 4b and 5b secure movement sensors 4 and 5 which receive movement indications from magnets 4a and 5a respectively. A similar set of sensor arrangements are out of sight behind the pipe, situated ninety peripheral degrees relative to the pipe centerline. The sensors system is not permanent and can be used briefly before welding begins, then removed.

Figure 3:
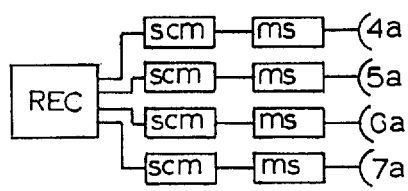
FIG. 3 is a schematic of a field condition sensor and recording system for use in the field to record pipe movement on an offshore platform.

The recording system shown in FIG. 3 will be at the site, connected to the sensors until the recording is completed.

Figure 2:
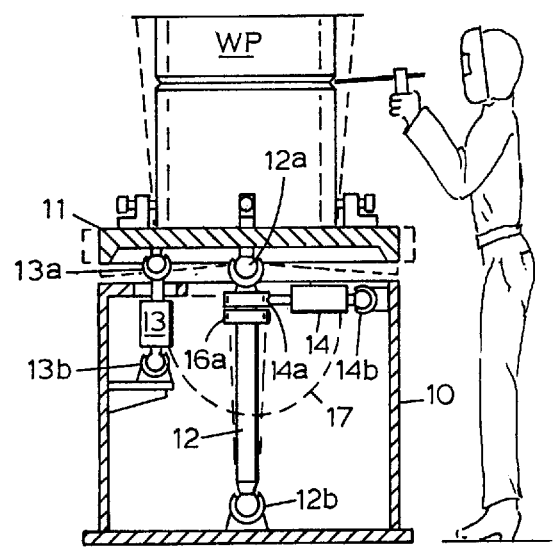
FIG. 2 is a side view, somewhat enlarged and partly cut away, of a welder training simulator.

In FIG. 2 simulator base 10 supports manipulator table 11 which, in turn, supports workpiece WP. Stabilizer bar 12 stands from the base on gimbal 12b and is attached to the table by gimbal 12a. Lateral actuator 14 is attached to the bar 12 by gimbal 14a and to the base by gimbal 14b. There is a similar lateral actuator 16 not visible, behind the bar 12. It is similarly attached to the base and is attached to gimbal 16a. Tilt actuator 13 is attached to the base by gimbal 13b and to the table by gimbal 13a. An identical tilt actuator 15 is similarly attached to the base and the table on the view side of the bar but is removed by the cut away.

An orthogonal view of FIG. 2 would present an identical structure if actuator 13 is changed to 15 and actuator 14 is changed to 16. Dashed line 17 represents synchronizing coupling between actuators. The actuators may be synchronized in pairs such as 13 and 15 or 14 and 16 to assure nutating or orbital movement. All four actuators can be synchronized for standardizing purpose. The linkage can be mechanical with flexible shafts, chains, or timing belts. The synchronizing link can be electrical if the actuator motors used are suitable for that form of control.

The tilt actuators are situated to act upon principal horizontal table axes, separated by ninety peripheral degrees about the table vertical axis. The tilt actuators, when properly synchronized, cause the table to nutate about the gimbal 12a. This action is often called a wobble plate action. The table lower point, will progress peripherally around the base centerline.

The lateral actuators 14 and 16 cause the table axis of symmetry to rotate around the vertical centerline of the base. The table 11 does not rotate.

The dashed lines representing tilt movement are shown outside the pipe profile and the dashed lines representing lateral movement of the workpiece are inside the pipe profile to avoid a confusion of dashed lines. To prevent table rotation, yet serve as gimbals, the ball and socket arrangements of 12a and 12b can be replaced by ordinary truck drive shaft universal joints. The actuators can be purchased with the gimbals intrinsic to the structure. The table is spaced above the base an amount too large to pinch hands when it tilts.

In FIG. 3 magnetic attachments 4a, 5a, 6a, and 7a are shown symbolically, attached to movement sensors ms, which are available as rod and sleeve linear transducers. The transducers supply a signal to the signal conditioners scm which, in turn provide a recordable signal to the recorder. This is a magnetic medium recorder which is readily available.

Figure 4:
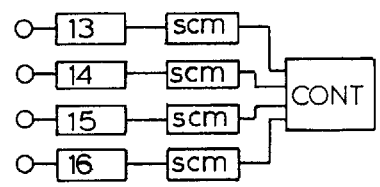
FIG. 4 is a schematic of a playback control system to use field recordings to control the simulator.

FIG. 4 shows the controller cont which responds to the magnetic medium recording of FIG. 3 to drive signal conditioners scm which provide a power and control signal to actuators 13, 14, 15, and 16. To control the simulator, to duplicate the pipe movement sensed and recorded in the field, the geometry of the sensor locations and the actuator locations have to be considered. The controller, supplied with the geometry relationships, computes the movement required of the actuators. As a prudent calibration means, a specified tilt and a specified lateral displacement signal is provided by the controller to run a specific movement program that can be checked physically on the simulator before the simulator is committed to the workpiece manipulation representing the movement recorded in the field.

FIG. 5 shows a simplified simulator for manual manipulation of the workpiece WP. The manipulator table is mounted on springs 23 between the base 20 and table 21. Stabilizer bar 22 prevents vertical movement of the table and mounted workpiece. Gimbals 22a and 22b permit lateral and tilt movements. A second workman moves the workpiece by way of manipulator bar 24. There are usually twelve springs 23 equally distributed about the top of base 20 each about equal distance from the table centerline.

It will be understood that certain features and sub-combinations are of utility and may be employed without reference to other features and sub-combinations. This is contemplated by and is within the scope of the claims.

As many possible embodiments may be made of the simulator of this invention without departing from the scope thereof, it is to be understood that all matter herein set forth or shown in the accompanying drawings is to be interpreted as illustrative and not in a limiting sense.

The invention having been described, I claim:

1. A procedure for simulating the movement of vertical pipe columns when being assembled at offshore platforms, the procedure comprising:

a) measuring and recording the movement of said pipe relative to said platform and recording signals characteristic of said movement on transportable medium;

b) conveying said recording to a prepared site for duplicating said movement;

c) mounting a representative specimen of said pipe on a manipulator table for limited tilt and transverse movement;

d) using the recording to control said manipulator table to move said mounted specimen as required to duplicate said movement of said column.

2. The procedure of claim 1 wherein said measuring and recording comprises measuring the tilt movement relative to vertical and measuring the horizontal movement of said pipe relative to said platform.

3. The procedure of claim 1 wherein said transportable medium is magnetic media.

4. The procedure of claim 1 wherein said using comprises data processing to yield data defining tilt and horizontal movement and further defining movement required of said actuators to produce on the simulator the same movements measured and providing controlling signals to said actuators to produce said movements.

5. A simulator for use for training welders to weld the junctions of vertical pipe columns that move while being welded, the simulator comprising:

a) a base;

b) a manipulator table with a vertical axis and means to secure a pipe specimen thereto to extend vertically along said axis;

c) means to secure said table atop said base for limited nutating movement and limited horizontal movement relative thereto;

d) first drive means to drive said table in said nutating movement; and e) second drive means to drive said table in said horizontal movement.

6. The simulator of claim 5 wherein said means to secure comprises a column with upper gimbal means to attach at the upper end to the general center of said table and with lower gimbal means to attach at the lower end to said base.

7. The simulator of claim 5 wherein said first drive means comprises at least two actuators oriented to move vertically, each attached to said table some horizontal distance from and peripherally distributed about said upper gimbal means.

8. The simulator of claim 5 wherein said means to drive said table in said nutating movement comprises two vertical actuators mounted on said base and attached to said table, each said actuator attached at preselected horizontal distance from said gimbal and peripherally distributed a preselected angle apart, each said actuator producing a sinusoidal movement and each actuator's said sinusoidal movement misphased from the other an angular amount equal to the amount of said angle apart.

9. The simulator of claim 5 wherein said second actuator means comprises two horizontal actuators mounted on said base, and peripherally distributed about said axis a preselected angle apart, each said actuator producing a sinusoidal output movement, each said sinusoidal movement misphased from the other an angular amount equal to said angle of peripheral distribution.

10. A simulator for training welders to weld on moving pipe strings, the simulator comprising:

a) a base with a vertical axis;

b) a manipulator table resiliently attached to said base for limited horizontal movement relative to said base and limited tilt movement relative to said axis, with means to attach a length of pipe, as a welding specimen, extending vertically therefrom;

c) a plurality of compression springs, each having a vertical axis of symmetry, peripherally distributed, upon said base, about said axis and each situated a preselected distance therefrom, by which said table is said resiliently attached; and whereby said table is movable relative to said base by application of force to cause said tilt and said horizontal movement.

11. The simulator of claim 10 whereby said table is secured a fixed distance above said base by a rigid, generally central, vertical link attached to said table at one end and to said base at the other end.

12. The simulator of claim 11 whereby said link is attached at each said end by gimbal attachment means.

* * * * *